US012126113B2

(12) United States Patent
Puluc et al.

(10) Patent No.: US 12,126,113 B2
(45) Date of Patent: Oct. 22, 2024

(54) SELF-SEALING ELECTRICAL PLUG AND SOCKET ASSEMBLY

(71) Applicant: R.A. Phillips Industries, Inc., Santa Fe Springs, CA (US)

(72) Inventors: Oscar Puluc, Santa Fe Springs, CA (US); Theron Davis, Santa Fe Springs, CA (US); Jonathon Boyd, Santa Fe Springs, CA (US); Luis Gonzalez, Coahuila (MX)

(73) Assignee: R.A. Phillips Industries, Inc., Irvine, CA (US)

( * ) Notice: Subject to any disclaimer, the term of this patent is extended or adjusted under 35 U.S.C. 154(b) by 40 days.

(21) Appl. No.: 17/761,559

(22) PCT Filed: Nov. 4, 2021

(86) PCT No.: PCT/US2021/058130
§ 371 (c)(1),
(2) Date: Mar. 17, 2022

(87) PCT Pub. No.: WO2022/098919
PCT Pub. Date: May 12, 2022

(65) Prior Publication Data

US 2024/0063572 A1 Feb. 22, 2024

Related U.S. Application Data

(60) Provisional application No. 63/110,158, filed on Nov. 5, 2020.

(51) Int. Cl.
*H01R 13/74* (2006.01)
*H01R 13/52* (2006.01)

(52) U.S. Cl.
CPC ....... *H01R 13/5202* (2013.01); *H01R 13/748* (2013.01)

(58) Field of Classification Search
CPC . H01R 13/5202; H01R 13/748; H01R 13/502
See application file for complete search history.

(56) References Cited

U.S. PATENT DOCUMENTS

2003/0054688 A1* 3/2003 Howard ............... H01R 13/447 439/559
2009/0269013 A1* 10/2009 Durand .............. H01R 13/6593 385/77
2015/0258905 A1* 9/2015 Fukushima ............ H01R 13/74 439/34
2016/0268721 A1* 9/2016 Harmon .................... B60D 1/64
2018/0062298 A1* 3/2018 Mogi ..................... H01R 27/02

* cited by examiner

*Primary Examiner* — Abdullah A Riyami
*Assistant Examiner* — Nelson R. Burgos-Guntin
(74) *Attorney, Agent, or Firm* — Lewis Roca Rothgerber Christie LLP

(57) ABSTRACT

According to some embodiments of the present disclosure, there is provided a first connector configured to be connected to an electrical cable, the first connector including an electrical connector configured to mate with and electrically connect to the electrical cable, and a body having a first end carrying a plurality of electrical terminals and having a second end coupled to an end of the electrical connector, the body including a sleeve extending from the first end to the second end, the sleeve being molded over and extending around the end of the electrical connector, and a flange axially extending outwardly from the first end of the body.

18 Claims, 7 Drawing Sheets

SELF-SEALING ELECTRICAL PLUG AND SOCKET ASSEMBLY

CROSS-REFERENCE TO RELATED APPLICATION(S)

This application is a U.S. national phase of International Patent Application No. PCT/US2021/058130, filed on Nov. 4, 2021, which claims priority to and the benefit of U.S. Provisional Patent Application No. 63/110,158, filed in the United States Patent and Trademark Office on Nov. 5, 2020, the entire disclosures of both of which are incorporated by reference herein.

FIELD

The present disclosure relates generally to electrical connectors.

BACKGROUND

Electrical connectors are utilized in a variety of applications to connect two or more electrical components together. For instance, electrical connectors are utilized to create an electrical connection between a trailer and a tractor (e.g., electrical connectors are utilized to create an electrical connection between a sleeper compartment of the tractor or a standard cab of the tractor and the trailer). However, conventional electrical connectors are prone to infiltration by water or contaminants, which tend to corrode and degrade the electrical system, leading to premature failure and/or downtime and repair. Further, as the electrical connector is often integrated with an electrical harness, a damaged harness requires the replacements of the entire electrical connector, which may be costly and time-consuming.

SUMMARY

Aspects of the present disclosure are directed to an electrical plug and socket assembly configured to be detachably connected to an electrical cable. In one embodiment, the electrical plug and socket assembly includes mating first and second connectors. The first connector includes a sleeve configured to extend around an electrical connector and a flange extending outward from the sleeve. The sleeve is molded over the electrical connector, which is configured to detachably mate with an electrical harness. When mated, the first and second connectors are configured to form a tight seal to prevent or substantially reduce the likelihood of infiltration of water and other contaminants into the electrical plug and socket assembly.

According to some embodiments of the present disclosure, there is provided a first connector configured to be connected to an electrical cable, the first connector including: an electrical connector configured to mate with and electrically connect to the electrical cable; and a body having a first end carrying a plurality of electrical terminals and having a second end coupled to an end of the electrical connector, the body including: a sleeve extending from the first end to the second end, the sleeve being molded over and extending around the end of the electrical connector; and a flange axially extending outwardly from the first end of the body.

In some embodiments, the electrical connector is fixedly coupled to the body and is configured to be detachably connected to the electrical connector.

In some embodiments, the first connector is a male connector including a plurality of pins coupled to the plurality of electrical terminals.

In some embodiments, the first connector is a female connector including a plurality of sockets coupled to the plurality of electrical terminals.

In some embodiments, the sleeve and the flange are monolithic.

In some embodiments, the flange is configured to be securely mounted to a wall.

In some embodiments, the flange includes: a base plate extending circumferentially from the sleeve and having openings therethrough for securing the base plate to a wall via securing mechanisms passing through the openings; and an outer skirt extending continuously and completely around an outer periphery of the base plate.

In some embodiments, the sleeve extends longitudinally along a straight path from the first end to the second end.

In some embodiments, the sleeve extends along a bent path from the first end to the second end.

In some embodiments, the first connector further includes: a ground connection protruding from the body and electrically coupled to a ground terminal of the plurality of electrical terminals, and including an end terminal configured to be physically and electrically coupled to a ground plane, wherein the sleeve is molded over and extends around the ground connection.

According to some embodiments of the present disclosure, there is provided an electrical plug and socket assembly including: a first connector configured to be connected to an electrical cable, the first connector including: an electrical connector configured to mate with and electrically connect to the electrical cable; and a first body having a first end carrying a plurality of first electrical terminals and having a second end coupled to an end of the electrical connector, the first body including: a sleeve extending from the first end to the second end, the sleeve being molded over and extending around the end of the electrical connector; and a first flange axially extending outwardly from the first end of the first body; and a second connector configured to mate with the first connector, the second connector including: a second body including a plurality of contacts; and a second flange extending outward from the second body.

In some embodiments, when the first and second connectors are mated, an outer skirt of the first flange extends over and overlaps an edge of the second flange.

In some embodiments, the first and second flanges have at least one pair of aligned openings configured to receive a fastener drawing the first and second flanges together.

In some embodiments, the electrical connector is fixedly coupled to the body and is configured to be detachably connected to the electrical connector.

In some embodiments, the sleeve and the first flange are monolithic.

In some embodiments, the sleeve extends longitudinally along a straight path from the first end to the second end.

In some embodiments, the sleeve extends along a bent path from the first end to the second end.

In some embodiments, the first connector further includes: a ground connection protruding from the body and electrically coupled to a ground terminal of the plurality of first electrical terminals, and including an end terminal configured to be physically and electrically coupled to a ground plane, wherein the sleeve is molded over and extends around the ground connection.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1A:
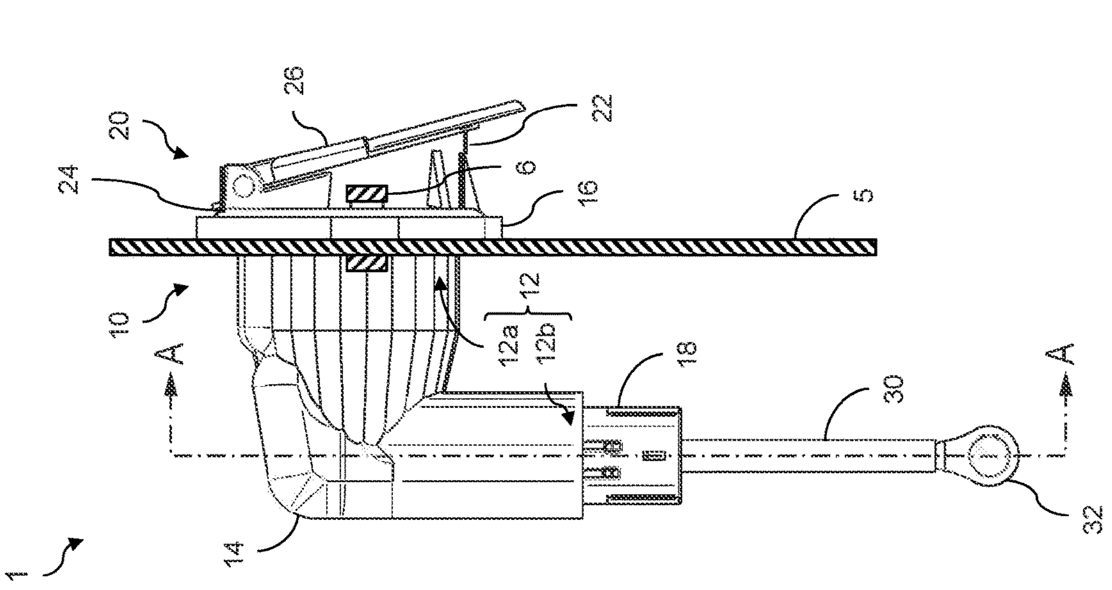
FIGS. 1A, 1B, 1C and 1D illustrate a side view, a front view, a rear view, and a bottom view of the electrical plug and socket assembly, respectively, according to some embodiments of the present disclosure.
Figure 1B:
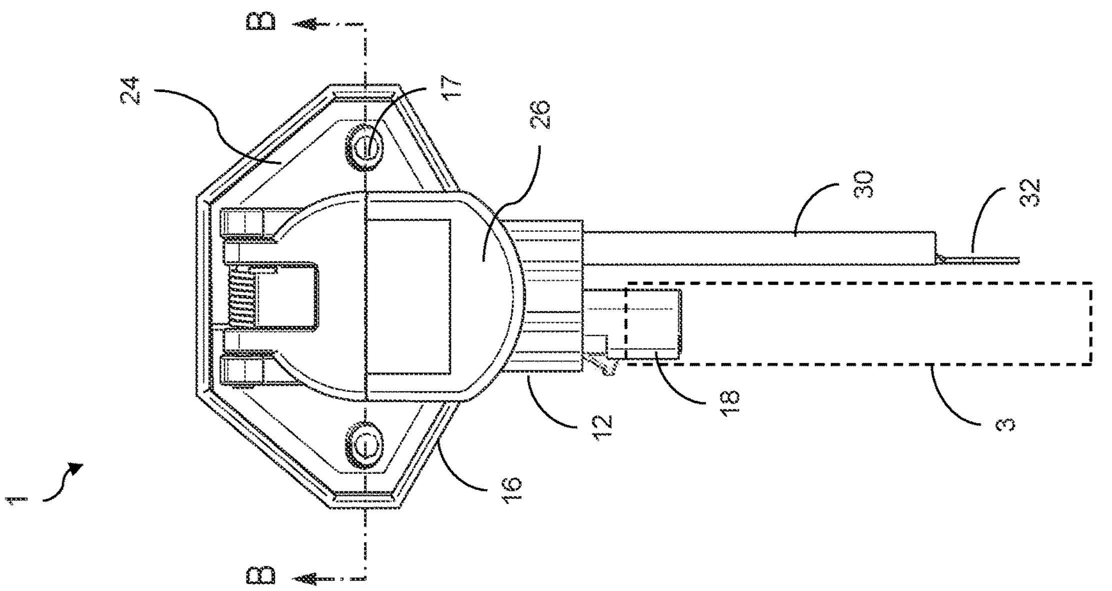
Figure 1C:
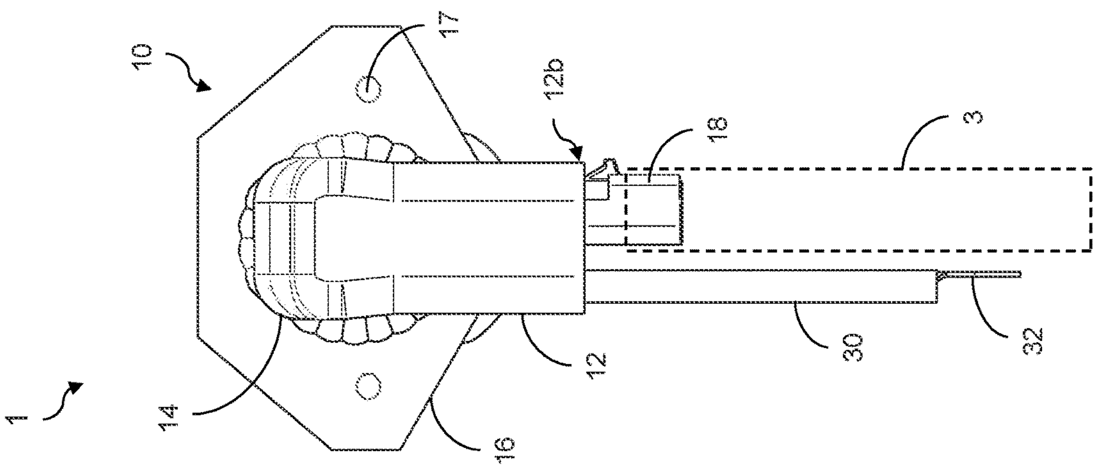

The present disclosure is directed to various embodiments of an electrical connector configured to be connected to an electrical cable. The electrical plug and socket assembly according to various embodiments of the present disclosure is configured to protect the electrical cable against the intrusion of debris and contaminants, or at least mitigate the risk of contaminant intrusion, which might otherwise corrode or degrade the electrical system. Further, the electrical plug and socket assembly is capable of a plug-and-play connection with an electrical harness.

The electrical cables and connectors of the present disclosure may be used to electrically couple any suitable electronic devices together, such as a tractor to a trailer (e.g., a sleeper compartment of the tractor or a standard cab of the tractor to the trailer). Suitable connection schemes for connecting a tractor to a trailer are described in U.S. Pat. No. 6,483,200, the entire content of which is incorporated herein by reference.

FIGS. 1A, 1B, 1C and 1D illustrate a side view, a front view, a rear view, and a bottom view of the electrical plug and socket assembly, respectively, according to some embodiments of the present disclosure.

In some embodiments, the electrical plug and socket assembly 1 includes a first connector (e.g., a first electrical socket) 10 configured to be connected to an electrical cable 3 and a second electrical connector (e.g., a second electrical socket) 20 configured to mate with the first connector 10. The electrical plug and socket assembly 1 is configured to be installed/mounted on a wall (e.g., a rear tractor wall or a front trailer wall) 5, for example, via two securing mechanisms (e.g., screws) 6. The first and second connectors 10 and 20 may be connected by way of a socket-barrel receiving hole provided in the wall 5.

The first connector 10 includes a body (e.g., a first body) 12 having a sleeve 14 and a flange (e.g., a circumferential mounting flange) 16. The sleeve 14 extends from a first end 12*a* to the second end 12*b* of the body 12, and the flange 16 axially extends outwardly from the outer periphery of the sleeve 14 at the first end 12*a* of the body 12. The sleeve 14 and the flange 16 may be integrally formed as one monolithic component (e.g., be made of the same material as). The first flange 16 may be generally heptagonal in shape and made of a hardened material, such as die cast metal, glass filled molded nylon, or the like. The sleeve 14 is molded over and extends around an end of an electrical connector 18 (e.g., an in-molded connector). The electrical connector 18 is configured to mate with and electrically connect to the electrical cable 3. In some examples, the body 12 of the first connector 10 is made of an elastomeric material.

Figure 1F:
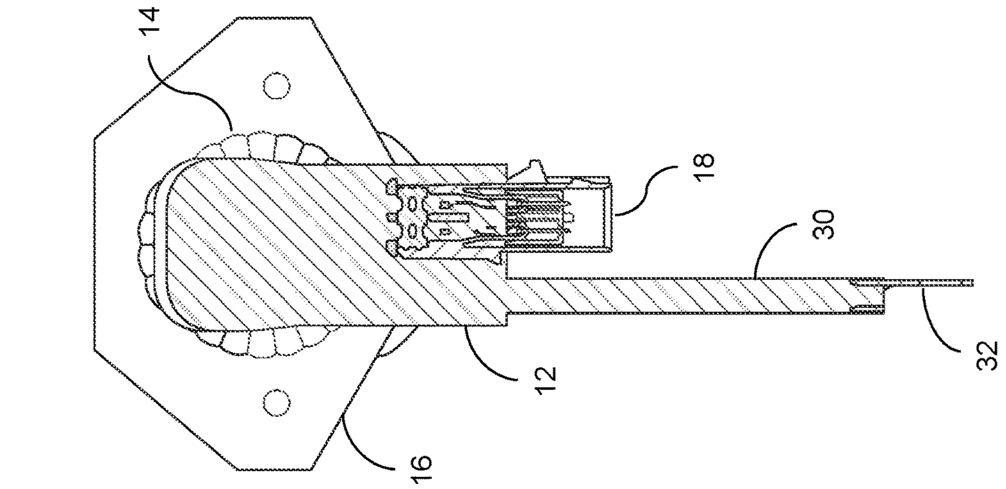
FIG. 1F is a cross-sectional view of the first connector taken along the line A-A of FIG. 1A showing a body being molded over the electrical connector, according to some embodiments of the present disclosure.
Figure 1E:
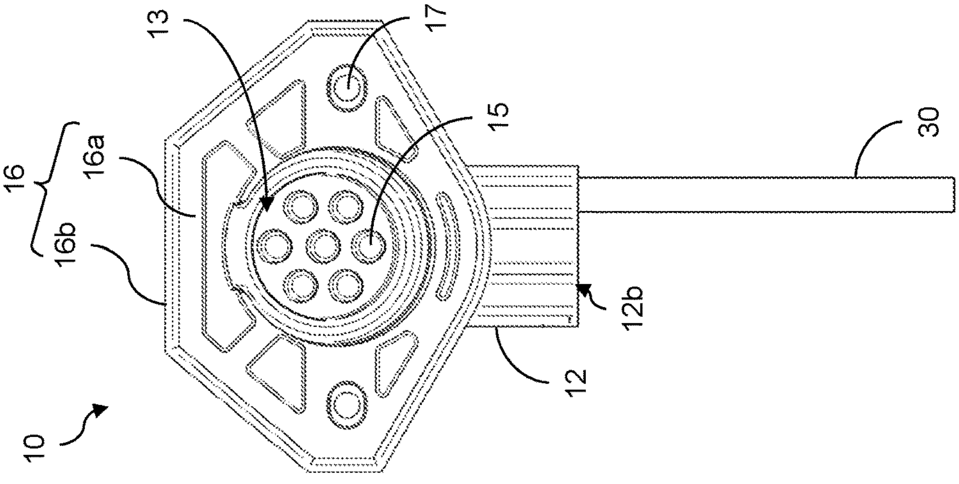
FIG. 1E illustrates a front view of a first connector of the electrical plug and socket assembly, according to some embodiments of the present disclosure.
Figure 1D:
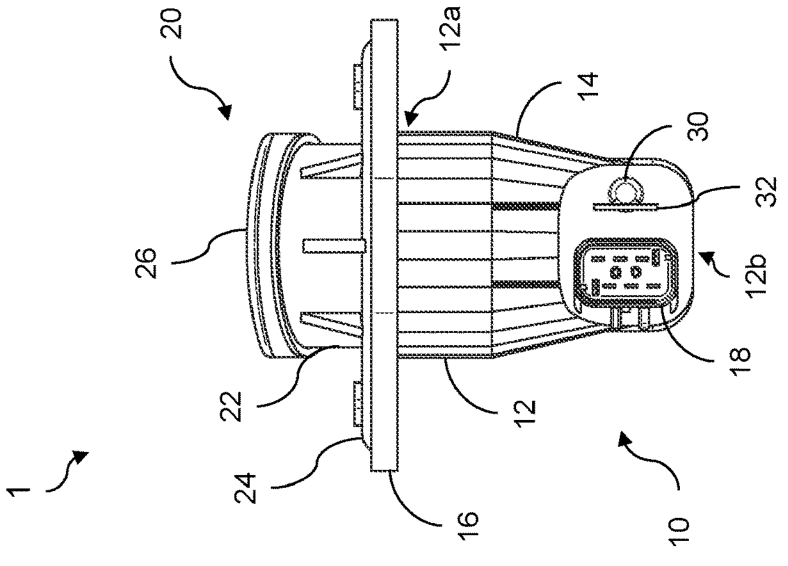

FIG. 1E illustrates a front view of a first connector of the electrical plug and socket assembly, according to some embodiments of the present disclosure.

Referring to FIG. 1E, the body 12 has a receptacle (e.g., a central opening) 13 that houses a plurality of first terminals 15 that are electrically connected to the electrical connector 18 at a distal end 12*b* of the body 12 opposite from the first flange 16. As shown in FIG. 1E, in some examples, the plurality of first terminals 15 may have a 7-way trailer connector configuration. The plurality of first terminals 15 may be female connection (as shown in FIG. 1E) or may be male connections.

The first flange 16 includes a base plate 16*a* extending circumferentially from the sleeve 14 and an outer skirt (e.g., lip) 16*b* extending continuously and completely around an outer periphery of the base plate 16*a*. The first flange 16 (e.g., the base plate 16*a*) of the first connector 10 has one or more openings 17 that may accommodate one or more securing mechanisms (e.g., screws) 6 to fasten the flange 16 to a wall 5. In some examples, the base plate of the second flange 16 has a protrusion/elevation pattern that matches a corresponding pattern on a second flange 24 of the second connector 20, which improves the friction fit and seal between the first and second connectors 10 and 20 and improves the ability of the mated first and second connectors 10 and 20 to prevent or substantially prevent moisture or debris/contaminants from entering the receptacle 13 and reaching the plurality of terminals 15.

Figure 2A:
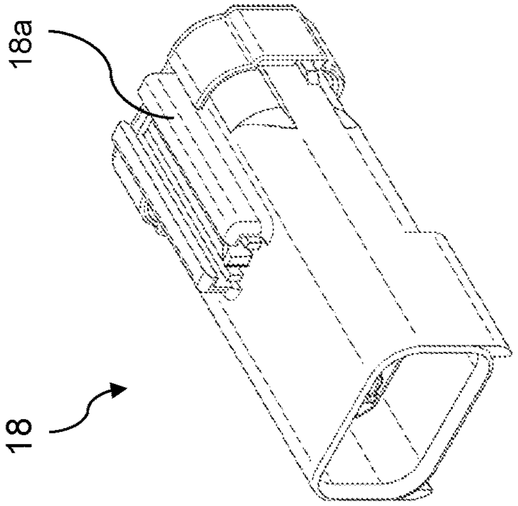
FIGS. 2A and 2B illustrates perspective views of the electrical connector.
Figure 2B:
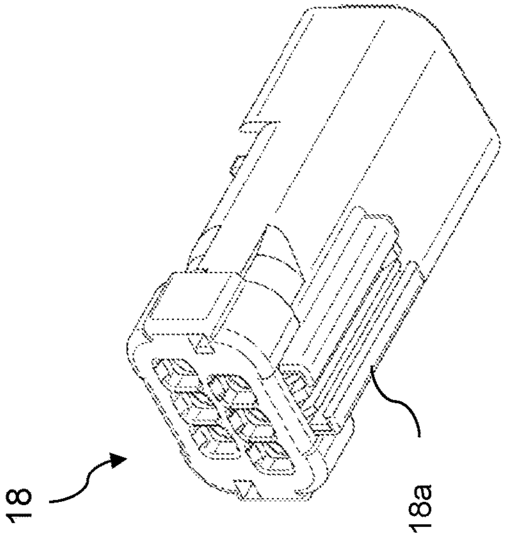
Figure 2C:
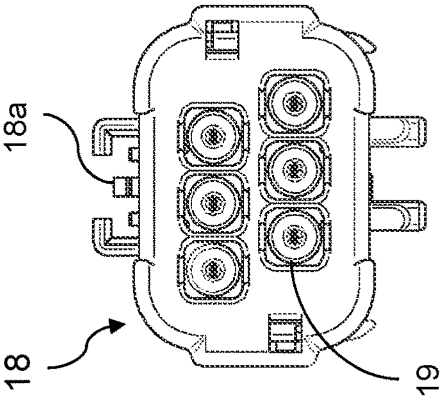
FIGS. 2C and 2D illustrate a rear view and a front view of the electrical connector, respectively, according to some embodiments of the present disclosure.
Figure 2D:
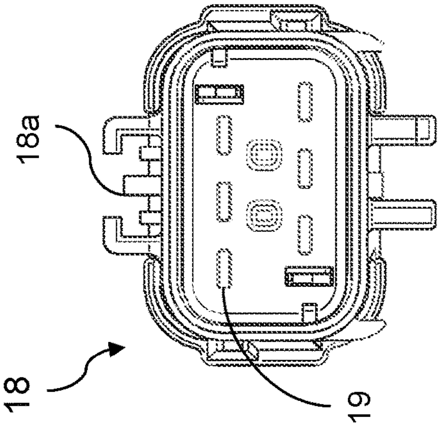

FIG. 1F is a cross-sectional view of the first connector 10 taken along the line A-A of FIG. 1A showing the body 12 being molded over the electrical connector 18, according to some embodiments of the present disclosure. FIGS. 2A and 2B illustrates perspective views of the electrical connector 18, and FIGS. 2C and 2D illustrate a rear view and a front view of the electrical connector 18, respectively, according to some embodiments of the present disclosure.

According to some embodiments, the in-molded connector 18 may partially extend into the body 12 and be overmolded by the first sleeve 14. Thus, the in-molded connector 18 is fixedly connected to the body 12 of the first connector 10. The in-molded connector 18 has a plurality of conductors 19 that are electrically coupled to the plurality of terminals 15 within the receptacle 13. The in-molded connector 18 is configured to mate with and electrically connect to a first electrical cable (e.g., a first multi-conductor electrical cable/harness) 3. Unlike the related art in which the electrical cable and assembly are integrated as one-piece, the first electrical cable 3 is detachable from the electrical plug and socket assembly 1, according to some embodiments. As such, when the first electrical cable/harness 3 is damaged for any reason, it can be easily replaced without the need to disassemble the plug and socket assembly 1 or to detach the assembly from the wall 5. This can significantly reduce the downtime and cost for the user in case of a faulty harness.

In some embodiments, the electrical connector 18 has at least one protrusion (e.g., an elongated key projection or keyway) 18*a* extending out from a side wall of the electrical connector 18, which increases the contact surface between the electrical connector 18 and the over-molded material of the sleeve 14 and increases the grip strength of the sleeve material. However, embodiments of the present disclosure are not limited thereto, and the electrical connector 18 may not have any protrusions.

Further, in examples in which the plurality of terminals 15 have 7 terminals, one of which is configured to carry a ground signal, the electrical connector 18 may have 6 conductors 19 that omit a ground conductor. The side of the electrical connector facing away from the body 12 may have female connectors or male connectors, as may be suitable in a given application.

Figure 3:
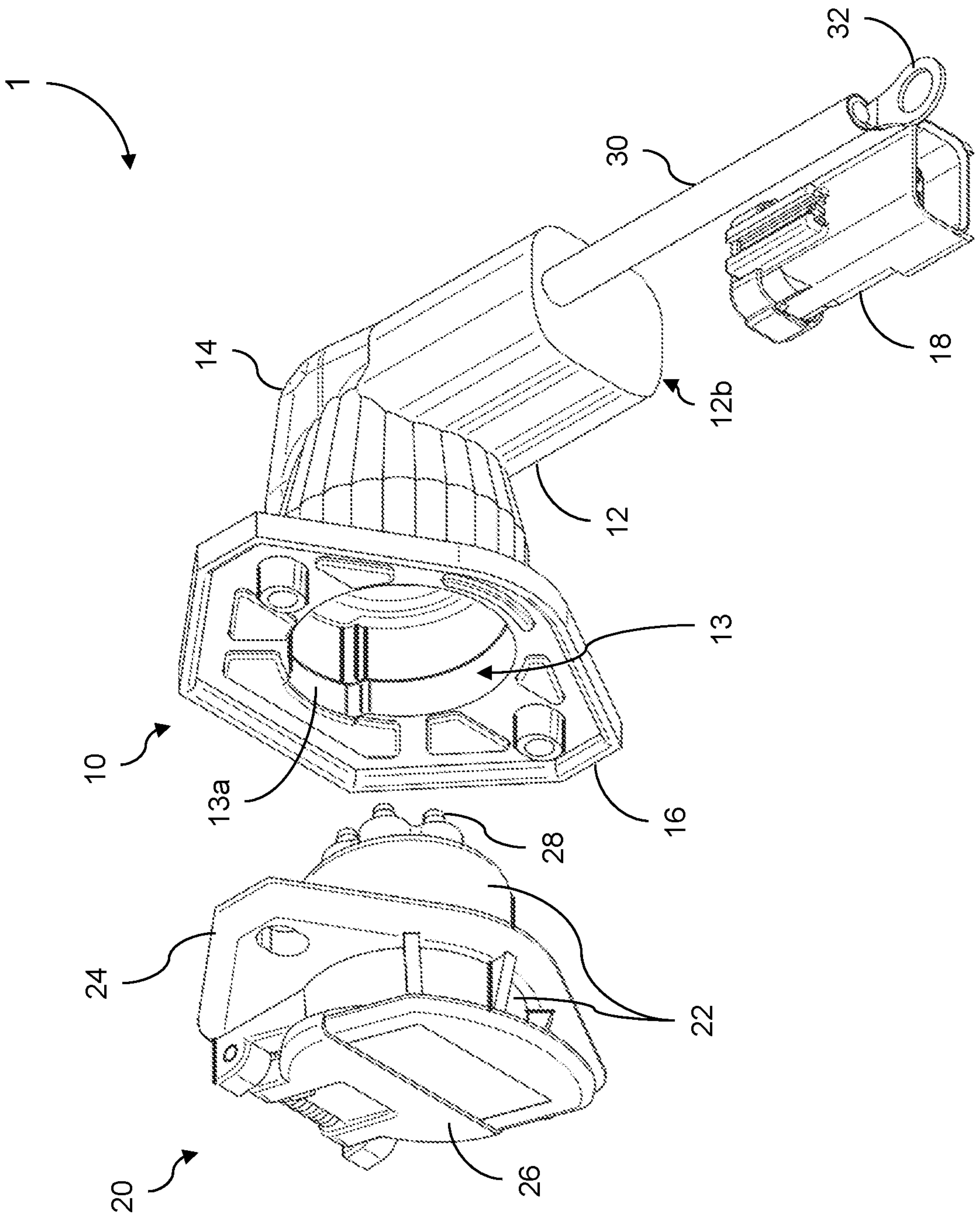
FIG. 3 illustrates an exploded perspective view of the electrical plug and socket assembly, according to some embodiments of the present disclosure.

FIG. 3 illustrates an exploded perspective view of the electrical plug and socket assembly 1, according to some embodiments of the present disclosure.

Referring to FIG. 2, the second connector (e.g., the second electrical socket) 20 includes a second body 22 (e.g., a socket barrel) configured to mate with (e.g., at least partially fit within) the first receptacle 13 of the first connector 10, and a second flange 24 configured to mate and form a seal with the first flange 16. The seal may mitigate the risk of contaminant intrusion. The second body 22 and the second flange 24 may be integrally formed as one monolithic component (e.g., formed from the same material as a single unitary body). In some examples, the second body 22 may be generally circular and may carry a plurality of electrical contacts (e.g., male pins) 28 that extend into the inside of the second body 22 and form a socket into which can be plugged an end of a second electrical cable (e.g., a second multi-conductor electrical cable/harness) connecting the tractor to a trailer. The electrical contacts 28 of the second body 22 are organized in an array/pattern that matches the first electrical terminals 15 of the first connector 10, and are configured to mate with the corresponding ones of the first electrical terminals 15 to establish an electrical connection with the in-molded connector 18. In some examples, the second body 22 may be a SAE J560 socket (the society of automotive engineers for standard J560). The socket is closeable by a spring loaded cap 26 hinged from the front face of the second flange 24.

In some examples, the first electrical terminals 15 are female terminals and the electrical pins 28 of the second body 22 are male pins or terminals. However, embodiments of the present disclosure are not limited thereto, and the first electrical terminals 15 may be male pins/terminals and the electrical pins 28 of the second body 22 may be female terminals if desired. As long as terminals/pins provide axial engage/disengage cooperation, they can be of any form or design which may be desired.

According to some examples, the peripheral integral first flange 16 may have the same outer perimeter shape as that of the second flange 24. A forward face of the first flange 16 may have a contour which is a mirror image of the contour of the rear face of the second flange 24. The walls of the first sleeve 14 and first flange 16 may be relatively thin such that those portions of the assembly 1 are readily deformable by hand. That deformability of the sleeve 14 and flange 16 makes it easy for them to be deformed and forced through a hole in the tractor wall from the rear (interior) side, if desired, of the tractor wall so that the first flange forward surface can abut the rear surface of the tractor wall circumferentially about the hole. Accordingly, the first sleeve 14, as so disposed in hole, can then return to its as-molded shape.

In some examples, the connection of the first connector 10 to the second connector 20 is completed by inserting the second body 22 into the receptacle 13 of the body (e.g., the first body) 12 to cause mating of the corresponding terminals and mating of the forward face of the first flange 16 with the rear face of second flange 24. The connection may be mechanically secured together by securing mechanisms 6 (e.g., bolts and nuts). For example, the bolts may pass through corresponding holes 17 formed in the first flange 16, the wall 5, and the second flange 24. In that way the first flange 16 is securely clamped between the wall 5 and the second flange 24 to hermetically seal the space between the first and second connectors 10 and 20. In some examples, an orienting key projection may be defined in the exterior of the socket barrel of the second connector 20 for cooperation with a mating keyway 13*a* in the inner surface of the first receptacle 13.

In some embodiments, the electrical plug and socket assembly 1 includes a ground connection (e.g., a ground drop-out wire) 30 for grounding the electrical plug and socket assembly 1. In some examples, at least one of the terminals/pins in the assembly 1 is designated as the ground terminal/pin and is electrically connected to the ground connection 30. The ground connection 30 may protrude from the first sleeve 14 and connect (e.g., physically and electrically connect) to a ground plane (e.g., a trailer wall, such as the wall 5) via an end terminal (e.g., a ring terminal) 32. The first sleeve 14 may be molded over at least a portion of the ground connection 30 to strengthen the physical connection between the ground connection 30 and the first connector 10. The ground connection 30 may extend from the second end 12*b* of the body 12 and is offset from electrical connector 18. This ground connection 30 protects the electrical plug and socket assembly 1 and connected circuitry against surges in electricity that may occur. Thus, the ground connection 30 may mitigate damage to, and increase the lifespan of, the electrical plug and socket assembly 1 and the connected circuitry. Further, by connecting the ground connection 30 to a conductive plane, such as a trailer wall, the entire conductive plane may act as a ground plane, which can significantly improve electrical grounding for all connected circuitry that are grounded by this conductive plane. This can lower electrical ground noise and thus improve performance of the connected circuitry.

As shown in FIGS. 1A-1F and 3, in some embodiments, the sleeve 14 extends along a bent path from the first end 12*a* to the second end 12*b*. For example, the sleeve 14 may have a 90 degree bend (i.e., the electrical connector 18 may extend in a direction substantially parallel with first flange 16). However, embodiments of the present disclosure are not limited thereto. For example, the sleeve 14 may extend longitudinally along a straight path from the first end 12*a* to the second end 12*b*.

Figure 4A:
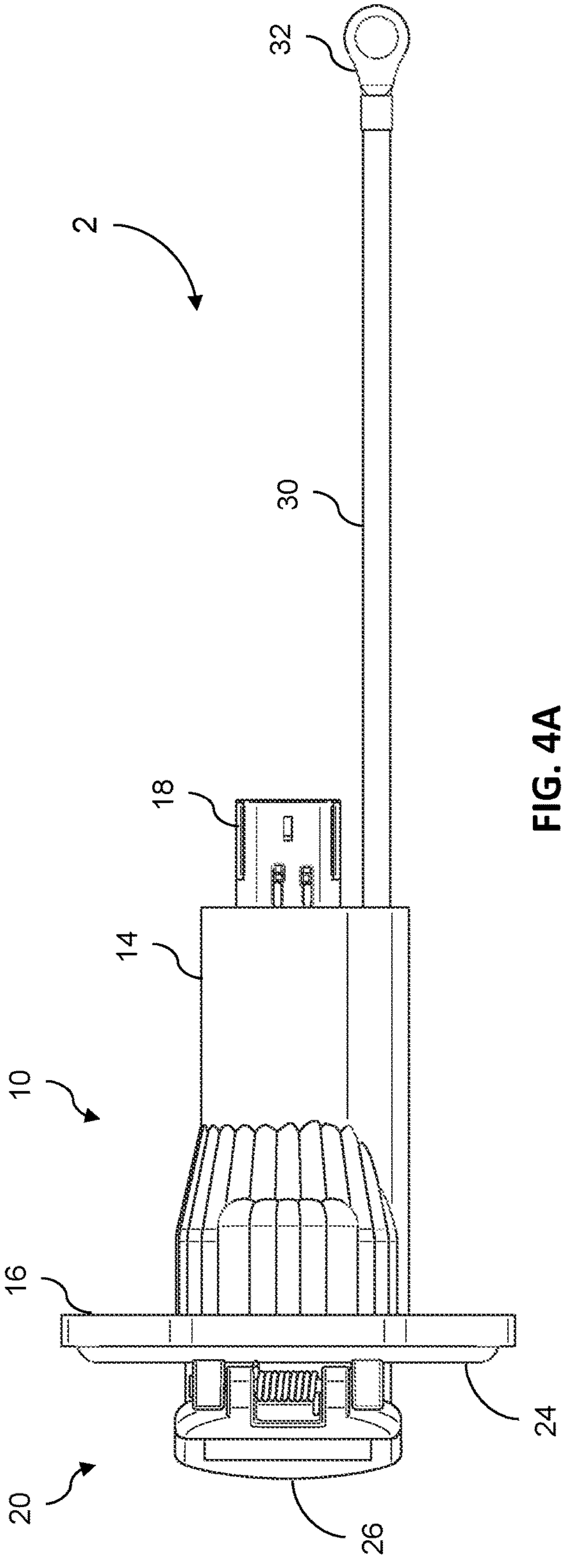
FIGS. 4A-4B illustrate a top view and a side view of an electrical plug and socket assembly having a straight configuration, respectively.
Figure 4B:
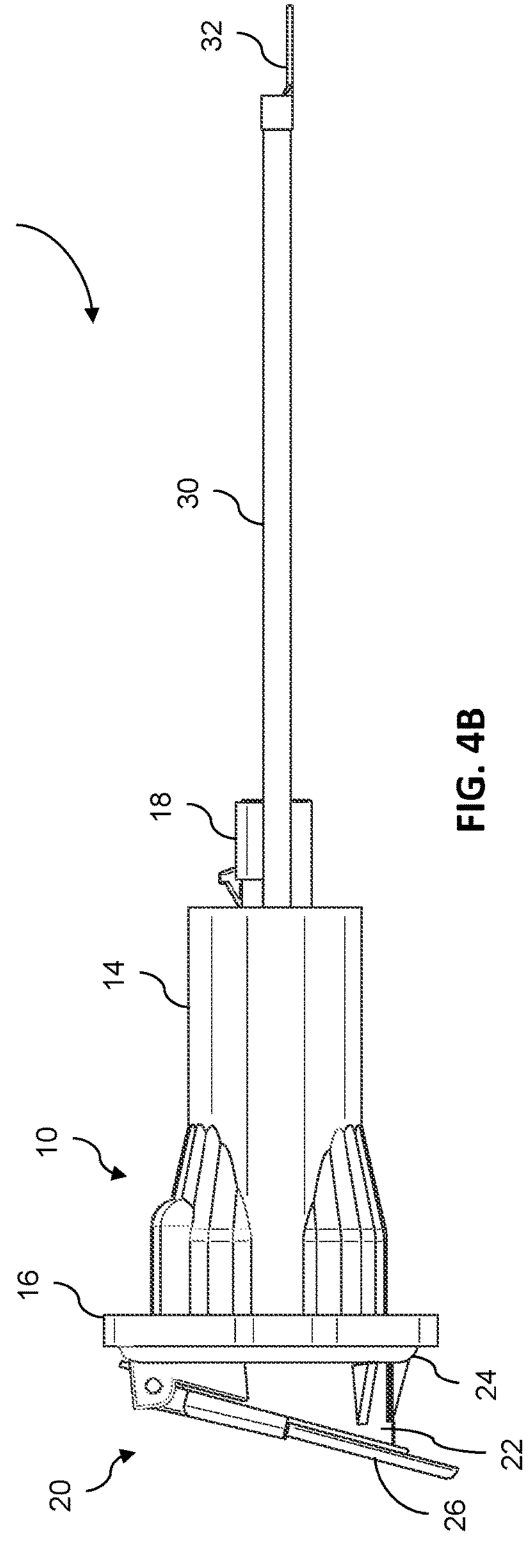
Figures 4C, 4D:
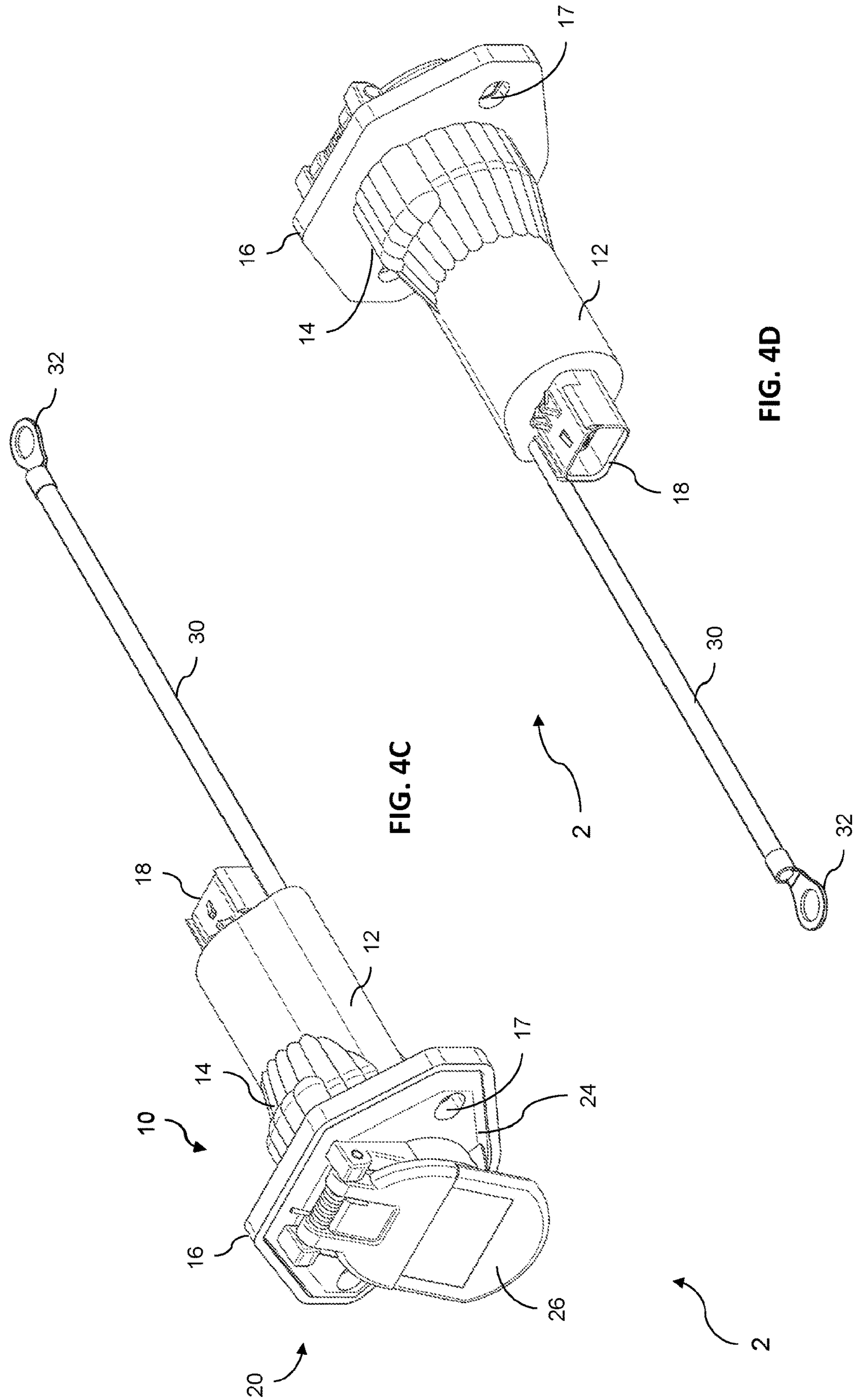
FIGS. 4C-4D illustrates perspective views of the electrical plug and socket assembly, according to some embodiments of the present disclosure.
Figure 5:
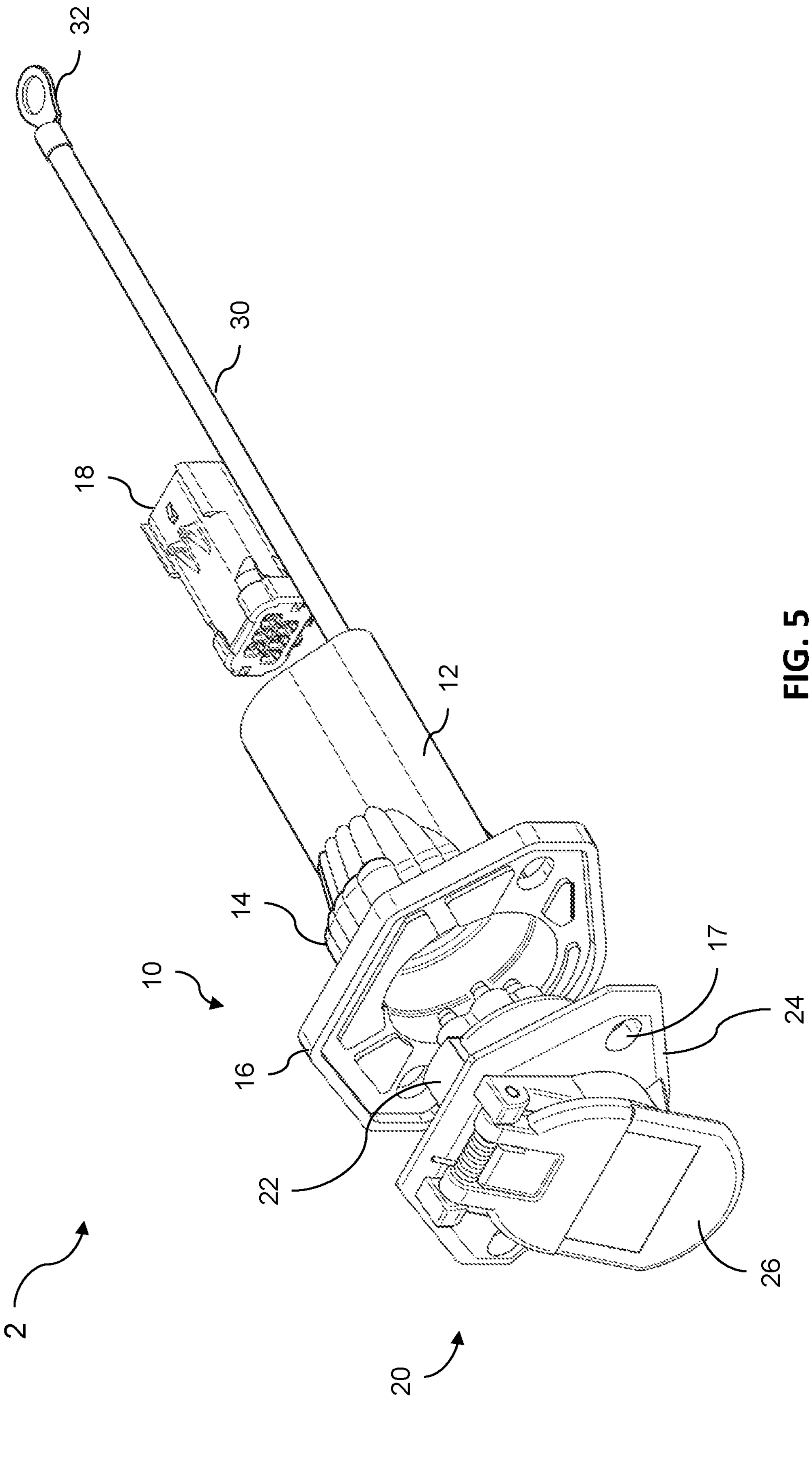
FIG. 5 illustrates an exploded perspective view of the electrical plug and socket assembly, according to some embodiments of the present disclosure.

FIGS. 4A-4B illustrate a top view and a side view of the electrical plug and socket assembly 2 having a straight configuration, respectively, and FIGS. 4C-4D illustrates perspective views of the electrical plug and socket assembly 2, according to some embodiments of the present disclosure. FIG. 5 illustrates an exploded perspective view of the electrical plug and socket assembly 2, according to some embodiments of the present disclosure.

The electrical plug and socket assembly 2 is substantially the same as that electrical plug and socket assembly 1 of FIGS. 1A-1F and 3 with the exception that the body 12 extends along a straight path substantially parallel to the extension direction of the electrical connector 18. As such, a description of common elements between the different configurations of the electrical plug and socket assembly will not be repeated herein.

As recognized by a person of ordinary skill in the art, the uses of the plug and socket assembly 1 described herein are not limited to truck tractors and trailers. For example, the plug and socket assembly 1 may be utilized in the mounting of electrical connection sockets to dollies which are used to support and to secure trailers in tandem truck rigs. Those dollies may their own brake and brake light systems.

It will be understood that, although the terms “first”, “second”, “third”, etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms “a” and “an” are intended to include the plural forms as well, unless the context clearly indicates otherwise. It will be further understood that the terms “include,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

Further, the use of “may” when describing embodiments of the inventive concept refers to “one or more embodiments of the inventive concept.” Also, the term “exemplary” is intended to refer to an example or illustration.

It will be understood that when an element or layer is referred to as being “on”, “connected to”, “coupled to”, or “adjacent” another element or layer, it can be directly on, connected to, coupled to, or adjacent the other element or layer, or one or more intervening elements or layers may be present. When an element or layer is referred to as being “directly on,” “directly connected to”, “directly coupled to”, or “immediately adjacent” another element or layer, there are no intervening elements or layers present.

As used herein, the terms “use,” “using,” and “used” may be considered synonymous with the terms “utilize,” “utilizing,” and “utilized,” respectively.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims.

What is claimed is:

1. A first connector configured to be connected to an electrical cable, the first connector comprising:
- an electrical connector configured to mate with and electrically connect to the electrical cable; and
- a body having a first end carrying a plurality of electrical terminals and having a second end coupled to an end of the electrical connector, the body comprising:
  - a sleeve extending from the first end to the second end, the sleeve being molded over and extending around the end of the electrical connector; and
  - a flange axially extending outwardly from the first end of the body,
- wherein the electrical connector has a protrusion extending from a sidewall of the electrical connector to increase a contact surface between the electrical connector and an over-molded material of the sleeve and to increase a grip strength of the sleeve.

2. The first connector of claim 1, wherein the electrical connector is fixedly coupled to the body and is configured to be detachably connected to the electrical connector.

3. The first connector of claim 1, wherein the first connector is a male connector comprising a plurality of pins coupled to the plurality of electrical terminals.

4. The first connector of claim 1, wherein the first connector is a female connector comprising a plurality of sockets coupled to the plurality of electrical terminals.

5. The first connector of claim 1, wherein the sleeve and the flange are monolithic.

6. The first connector of claim 1, wherein the flange is configured to be securely mounted to a wall.

7. The first connector of claim 1, wherein the flange comprises:
- a base plate extending circumferentially from the sleeve and having openings therethrough for securing the base plate to a wall via securing mechanisms passing through the openings; and
- an outer skirt extending continuously and completely around an outer periphery of the base plate.

8. The first connector of claim 1, wherein the sleeve extends longitudinally along a straight path from the first end to the second end.

9. The first connector of claim 1, wherein the sleeve extends along a bent path from the first end to the second end.

10. The first connector of claim 1, further comprising:
- a ground connection protruding from the body and electrically coupled to a ground terminal of the plurality of electrical terminals, and comprising an end terminal configured to be physically and electrically coupled to a ground plane,
- wherein the sleeve is molded over and extends around the ground connection.

11. An electrical plug and socket assembly comprising:
- a first connector configured to be connected to an electrical cable, the first connector comprising:
  - an electrical connector configured to mate with and electrically connect to the electrical cable; and
  - a first body having a first end carrying a plurality of first electrical terminals and having a second end coupled to an end of the electrical connector, the first body comprising:
    - a sleeve extending from the first end to the second end, the sleeve being molded over and extending around the end of the electrical connector; and
    - a first flange axially extending outwardly from the first end of the first body; and a second connector configured to mate with the first connector, the second connector comprising:

a second body comprising a plurality of contacts; and a second flange extending outward from the second body, wherein the electrical connector has a protrusion extending from a sidewall of the electrical connector to increase a contact surface between the electrical connector and an over-molded material of the sleeve and to increase a grip strength of the sleeve.

12. The electrical plug and socket assembly of claim 11, wherein, when the first and second connectors are mated, an outer skirt of the first flange extends over and overlaps an edge of the second flange.

13. The electrical plug and socket assembly of claim 11, wherein the first and second flanges have at least one pair of aligned openings configured to receive a fastener drawing the first and second flanges together.

14. The electrical plug and socket assembly of claim 11, wherein the electrical connector is fixedly coupled to the first body and is configured to be detachably connected to the electrical connector.

15. The electrical plug and socket assembly of claim 11, wherein the sleeve and the first flange are monolithic.

16. The electrical plug and socket assembly of claim 11, wherein the sleeve extends longitudinally along a straight path from the first end to the second end.

17. The electrical plug and socket assembly of claim 11, wherein the sleeve extends along a bent path from the first end to the second end.

18. The electrical plug and socket assembly of claim 11, wherein the first connector further comprises:

a ground connection protruding from the first body and electrically coupled to a ground terminal of the plurality of first electrical terminals, and comprising an end terminal configured to be physically and electrically coupled to a ground plane, wherein the sleeve is molded over and extends around the ground connection.

* * * * *